L. FLEISCHMANN & G. STERN.
CONTROL OF SEPARATELY EXCITED GENERATORS PROVIDED WITH AUXILIARY POLES.
APPLICATION FILED MAR. 11, 1908.

905,508.

Patented Dec. 1, 1908.

Witnesses
J. Ellis Glen.
J. Earl Ryan.

Inventors
Lionel Fleischmann
Georg Stern
by Albert B. Davis
Atty

UNITED STATES PATENT OFFICE.

LIONEL FLEISCHMANN AND GEORG STERN, OF BERLIN, GERMANY, ASSIGNORS TO GENERAL ELECTRIC COMPANY, A CORPORATION OF NEW YORK.

CONTROL OF SEPARATELY-EXCITED GENERATORS PROVIDED WITH AUXILIARY POLES.

No. 905,508.     Specification of Letters Patent.     Patented Dec. 1, 1908.

Application filed March 11, 1908. Serial No. 420,338.

*To all whom it may concern:*

Be it known that we, LIONEL FLEISCHMANN, a citizen of the United States, and GEORG STERN, a subject of the King of Prussia, residing at Berlin, Germany, have invented certain new and useful Improvements in the Control of Separately-Excited Generators Provided with Auxiliary Poles, of which the following is a specification.

Our invention relates to the control of separately excited generators provided with auxiliary poles, and has for its object a novel control whereby such generators are prevented from building up as series machines.

Separately excited generators provided with auxiliary or commutating poles have been frequently employed for controlling motors through wide ranges of speed, especially where the motors are used for hoisting. In such a control system the armature of the motor is supplied with current from the separately-excited generator, the field of the motor also being separately excited. By varying the voltage of the separately-excited generator from a maximum to a minimum and then to a maximum in the opposite direction, the motor speed is varied from a maximum in one direction to zero, and then to a maximum in the other direction. Even with the generator field circuit open, however, the generator produces a voltage due to the residual magnetism in the main poles which, unless the armature circuit is opened, causes a flow of current in the armature circuit. This flow of current displaces the magnetic field nearly ninety electrical degrees from its normal position, and the commutating pole windings, which are in series with the armature circuit, tend to act as series field windings and make the generator build up as a series machine. This action may be avoided by opening the armature circuit, but in so doing, the control system is complicated.

By our invention this building up of a separately excited generator with an auxiliary field as a series machine is prevented, without necessitating the opening of the armature circuit. This we accomplish by providing means for "killing" the auxiliary field when the main field circuit of the generator is broken.

Figure 1:
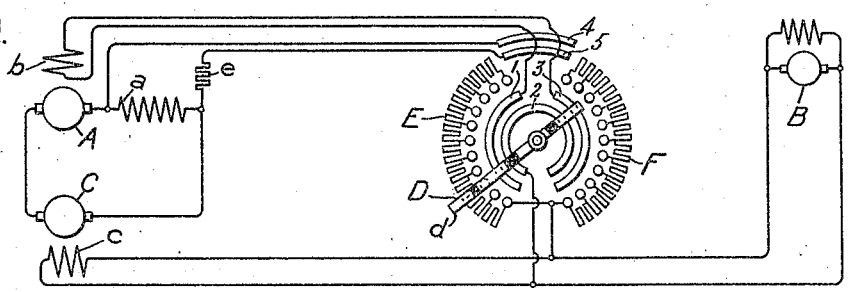
Figure 2:
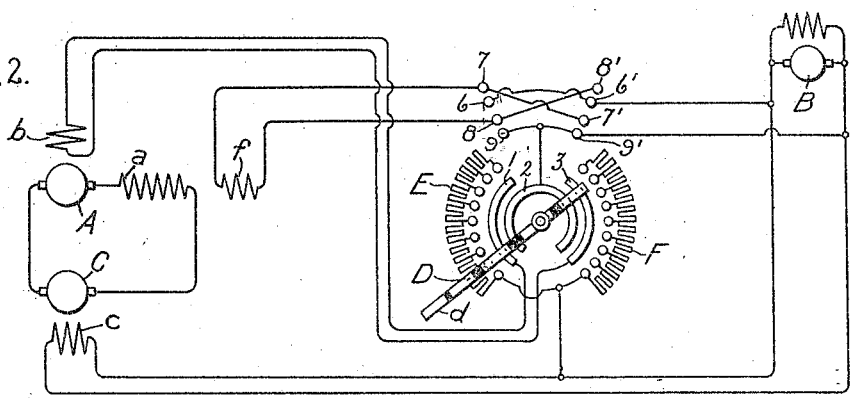
Figure 3:
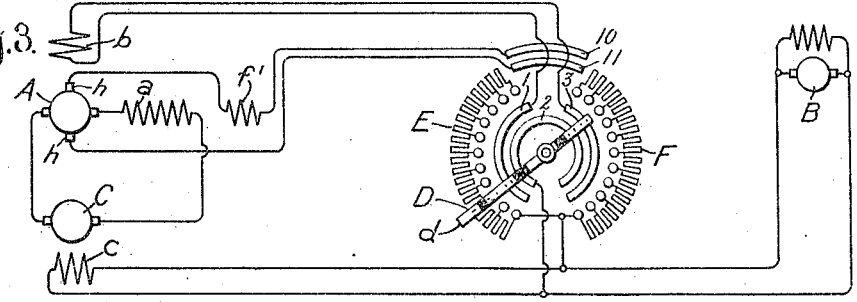

For a better understanding of our invention and the advantages possessed by it, reference may be had to the following description taken in connection with the accompanying drawing, in which Figure 1 shows diagrammatically a control system according to our invention, in which the auxiliary field is "killed" by a short-circuiting switch connected across the terminals of the auxiliary field winding, and arranged to be closed when the controller is in the "off" position. Fig. 2 shows a modification of our control system in which the auxiliary field is "killed" by means of a winding which is excited from the separate exciter in such a direction as to create a magnetomotive force in the opposite direction to the auxiliary field. Fig. 3 shows a further modification in which the auxiliary field is "killed" by means of a winding, the excitation for which is taken from auxiliary brushes on the main generator, and is so directed as to create a field in opposition to the auxiliary field.

In all the figures, A represents the armature of the separately-excited generator with auxiliary field-pole winding $a$, and separately-excited field winding $b$. This generator may be driven in any suitable manner.

B represents the separate exciter, which may be a small generator driven by suitable means, or may be a battery.

C represents the armature of the motor, which is supplied with current from the generator A, and $c$ represents the separately-excited field of the motor C, which is supplied with constant excitation from the exciter B.

D represents the controlling switch which is arranged to connect the generator field $a$ to the exciter B to vary the current supplied to the generator field, and in its "off" position to actuate means for "killing" or annulling the auxiliary field, so as to keep the generator from building up as a series machine.

In the figures, the switch D is shown in operative position for one direction of rotation. In this position it will be noticed that a circuit is completed from the exciter B, through the resistance E, the control switch D, contact 1, through generator field $b$, contacts 3, and 2, to the other terminal of the exciter. By moving the switch D, more or less of the resistance E is cut into the circuit of the field *b*. Starting from the vertical or "off" position, the longer arm *d* of the switch D being at the top, and moving it in either direction, the field is closed through the whole of resistance E or F, depending upon the direction of rotation desired of the motor C. If moved in the opposite direction from that shown in the figures, the same circuit connections would have been established, except the resistance F would have been used instead of E, and the current through the field *b*, and consequently the generator voltage, would have been reversed.

Referring now particularly to Fig. 1, if it is desired to stop the rotation of the motor, the control switch is moved backward toward the vertical, cutting more of the resistance E into the field *b*, until the whole resistance is cut in, after which the field circuit is broken, and the auxiliary pole winding short-circuited through the contacts 4 and 5 by means of the switch D, thereby "killing" the auxiliary or commutating field. This short-circuit may contain a resistance *e*. By moving the switch in a similar manner, in a circuit as shown in Fig. 2, after breaking the field circuit *b*, a circuit is made from the exciter B, through the contacts 6 and 7, the winding *f*, which is also placed on the auxiliary poles, through the contacts 8 and 9, to the other terminal of the exciter. In case the control switch had been in the position for the opposite direction of rotation, a movement of the switch F to the "off" position reverses the direction of the current through the winding *f*, by means of the contacts 8', 6', 7' and 9'. The direction of the current through the second winding *f* on the auxiliary poles, creates a magnetomotive force which is opposed to that created by the winding *a*. Thus the weakening of the auxiliary pole excitation can be so proportioned that the excitation of the auxiliary poles is annulled.

In Fig. 3 the winding *f'* is similar to the winding *f* in Fig. 2, and in the "off" position of the switch D, a circuit is made through this winding *f'*, the contacts 10 and 11, and through the auxiliary brushes *h* of the generator. These auxiliary brushes are placed midway between the main brushes. The potential between the auxiliary brushes *h* reverses with a reversal of the direction of current in the main circuit, and consequently, it is not necessary to reverse the connections to the winding *f'* in Fig. 3. When the control switch is in its "off" position and the connections are properly made so as to annul or "kill" the tendency of the auxiliary field to act as a series field, all current supplied to the motor is effectively diminished to a very small amount, and practically to zero, without opening the armature circuit.

What we claim as new, and desire to secure by Letters Patent of the United States, is,—

1. In combination with a separately-excited generator having an auxiliary field and a motor supplied by said generator, means for controlling the main field strength of the generator to vary the voltage supplied to said motor, and means for "killing" said auxiliary field when the main field circuit of the generator is broken.

2. In combination with a generator having an auxiliary field and a motor supplied by the generator, a separate source of current, and a controlling switch adapted to connect the main field of the generator to said source to vary the amount of current supplied to said main field, and in its "off" position to actuate means for "killing" said auxiliary field when the main field circuit of the generator is broken.

3. In combination with a generator having an auxiliary field winding in series with the armature of said generator, and a motor supplied by said generator, means for controlling the main field strength of the generator to vary the voltage supplied to said motor, and means for "killing" said auxiliary field when the main field circuit of the generator is broken.

4. In combination with a generator having an auxiliary field winding in series with the armature of said generator, of a motor supplied by said generator, means for controlling the main field strength of the generator to vary the voltage supplied to said motor, a second auxiliary field winding, and means for supplying said second auxiliary field winding with current so as to create a magnetomotive force in opposition to that of the first winding.

5. In combination with a generator having an auxiliary field winding in series with the armature of said generator, of a motor supplied by said generator, a separate source of current, a second auxiliary field winding, and a controlling switch adapted to connect the main field winding of the generator to said source, to vary the amount of current supplied to said main field winding, and in its "off" position to connect said second auxiliary field winding with a source of current so as to create a magnetomotive force in opposition to that of the first winding to prevent said generator from building up as a series machine.

6. In combination with a generator having an auxiliary field winding in series with the armature of said generator, of a motor supplied by said generator, a separate source of current, a second auxiliary field winding, and a controlling switch adapted to connect the main field winding of the generator to said source, to vary the amount of current supplied to said main field winding, and in its "off" position to connect said second auxiliary field winding to said source so as to create a magnetomotive force in opposition to that of the first winding to prevent said generator from building up as a series machine.

7. In combination with a generator having an auxiliary field winding in series with the armature of said generator, of a motor supplied by said generator, a separate source of current, means for controlling the main field strength of the generator to vary the voltage supplied to said motor, a second auxiliary field winding, and means for supplying said second auxiliary field winding with current from said source so as to create a magnetomotive force in opposition to that of the first winding to prevent said generator from building up as a series machine.

8. In combination with a generator having an auxiliary field winding in series with the armature of said generator, and a motor supplied by said generator, means for controlling the main field strength of the generator to vary the voltage supplied to said motor, and means for "killing" the auxiliary field when the main field circuit of the generator is broken comprising an opposing winding on said auxiliary field and a source of current supplying said opposing winding.

9. In combination with a generator having an auxiliary field winding in series with the armature of said generator, and a motor supplied by said generator, a separate source of current, and a controlling switch adapted to connect the main field winding of the generator to said source to vary the amount of current supplied to said main field winding and in its "off" position to actuate means for "killing" said auxiliary field so as to keep the generator from building up as a series machine, said means comprising an opposing winding on the auxiliary field and connections to said separate source of current.

In witness whereof, we have hereunto set our hands this twenty-first day of February 1908.

LIONEL FLEISCHMANN.
GEORG STERN.

Witnesses:
RICHARD NEUMANN,
JOHANN ALEXANDER.